United States Patent [19]

Wang

[11] Patent Number: 4,762,470
[45] Date of Patent: Aug. 9, 1988

[54] STRUCTURE OF AIR PUMP FOR FISH BOWL

[76] Inventor: Chiao-Ming Wang, No. 27, Jingmei Road, Taipin Hsiang, Taichung Hsien, Taiwan

[21] Appl. No.: 100,326

[22] Filed: Sep. 23, 1987

[51] Int. Cl.$^4$ ........................ F04B 45/04; F04B 39/00
[52] U.S. Cl. .................................... 417/312; 417/313; 417/413; 417/566; 181/264
[58] Field of Search .............. 417/312, 413, 540, 566, 417/571, 542; 138/26, 45; 181/264, 272

[56] References Cited

U.S. PATENT DOCUMENTS

| | | | |
|---|---|---|---|
| 3,838,944 | 10/1974 | Kolfertz | 417/312 |
| 3,900,276 | 8/1975 | Dilworth | 417/542 |
| 4,608,000 | 8/1986 | Tominaga | 417/413 |
| 4,666,378 | 5/1987 | Ogawa | 417/571 |

FOREIGN PATENT DOCUMENTS 59102 6/1984 Taiwan .

*Primary Examiner*—Carlton R. Croyle
*Assistant Examiner*—Leonard P. Walnoha
*Attorney, Agent, or Firm*—Bacon & Thomas

[57] ABSTRACT

A structural improvement made in the air pump usable in either a single or a plurality of fish bowls. The diaphragms used to prevent the air from flowing in reverse are specially designed in a shape which can be inserted into the outlet of air circulating ports of the pump so as to prevent the diaphragms from slipping away and detaching from the air circulating ports, and finally losing the one-way discharge function accordingly.

1 Claim, 1 Drawing Sheet

U.S. Patent
Aug. 9, 1988
4,762,470
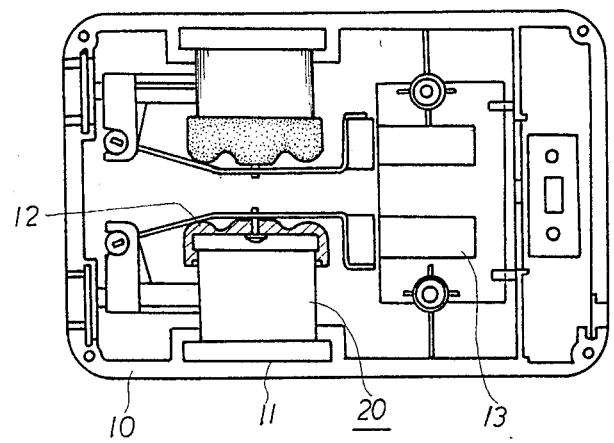
FIG.1
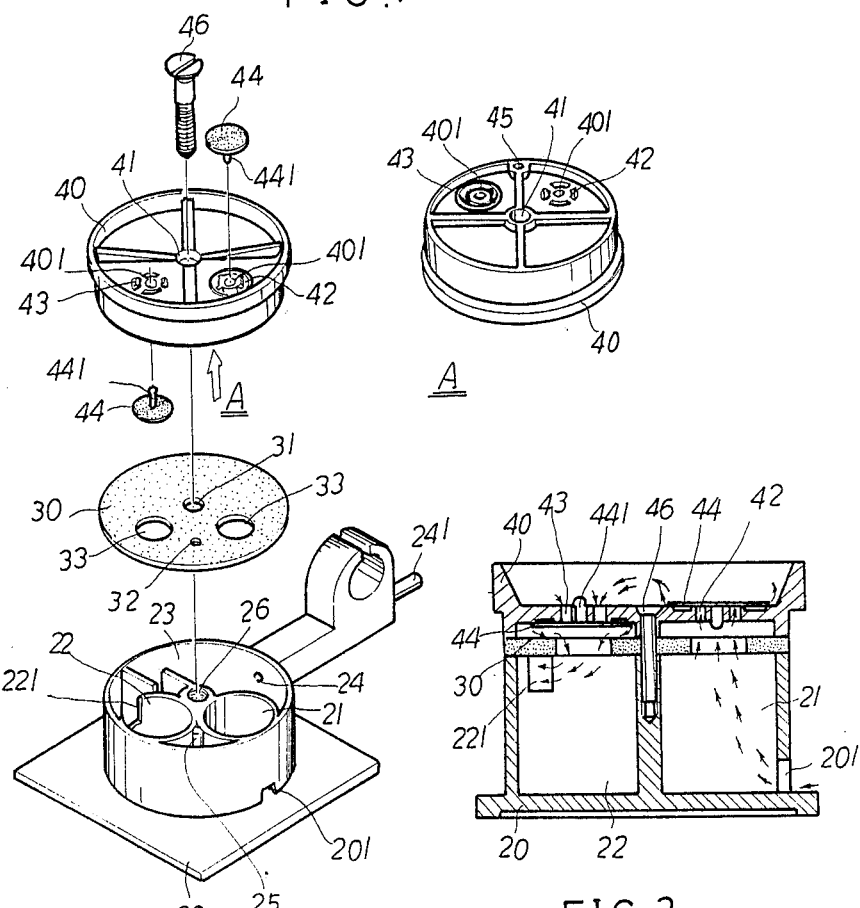
FIG.2
FIG.3

4,762,470

STRUCTURE OF AIR PUMP FOR FISH BOWL

BACKGROUND OF THE INVENTION

The present invention relates to an improved structure of an air pump for a fish bowl, and more particularly, to an improved practical structure of an air pump for a fish bowl which will greatly reduce the noise of operation.

Prior art structure of an air pump for a fish bowl, such as that being disclosed in Taiwan Pat. No. 59102, for example, generally has one-way discharge function by covering stoppers onto thin diaphragms at the discharge valve ports. However, since the peripheries of the stoppers are plane surfaces, both the stoppers and the diaphragms will detach from their original portions due to continuous operation, and the discharge function of the pump stops accordingly. It is mainly because the stoppers are too thin and the contact face of the stoppers' peripheries with intake/discharge ports is rather straight that they will inevitably slip away and finally detach from their position under continuous vibration in long term operation.

There are some other air pumps for fish bowls, having an upwardly projecting one-piece molded rod at the center of the discharge valve port onto which a rubber diaphragm with a central opening may be put to cover the valve port to effect one-way discharge function. Even with such a structure, the contact face of the diaphragms with the valve ports is still not large enough to keep them from detachment under constant push by the air. Once the diaphragms would even slightly slip away from their original positions, they would not be able to tightly engage with the discharge valve port, and the air would soon flow in reverse and finally lead to insufficient discharge of air. The users, consequently would have to frequently check and even repair the diaphragms to maintain the normal operation of the pump. This obviously causes the users a lot of unnecessary trouble.

It is an important object of the present invention to provide an improved structure of an air pump for a fish bowl, wherein two rubber-made diaphragms with a one-piece molded projecting rod are inserted into the engaging holes centered at the air circulating ports respectively so that the contact face of the diaphragms with the air circulating ports and the friction force so produced over there will be large enough to meet the expected requirement of fixing the diaphragms and preventing them from detachment.

BRIEF DESCRIPTION OF THE DRAWINGS

A specific embodiment of the invention will now be described with reference to the accompanying drawings in which:

FIG. 1 is a side elevational view of the pump casing showing the relative location of the present invention to the pump casing.

FIG. 2 is an exploded perspective view of the present invention.

FIG. 3 is a vertical cross sectional view showing the assembly of the present invention.

DETAILED DESCRIPTION OF THE INVENTION

As shown in FIG. 1, the pump stock 20 of the present invention is positioned in the recess 11 inside of the pump casing 10. On the top of the pump stock 20, a soft pump diaphragm 12 is covered and is shiftable up and down while an electromagnet 13 set aside thereof is actuated to create an electromagnetic field and causes a magnetic block fixed on the top of said pump diaphragm 12 to vibrate and consequently drags said pump diaphragm 12 to compress air into the pump stock 20.

Now referring to FIG. 2 and FIG. 3, the air chamber of the pump stock 20 is divided into three portions: the intake chamber 21, the discharge chamber 22, and the air circulating chamber 23. There is an intake port 201 set at a proper position on the lower side wall of the intake chamber 21, while a side opening 221 is formed on the upper side wall of the discharge chamber 22 at a proper place so that the latter may communicate with the air circulating chamber 23. In the air circulating chamber 23, there are several radially projecting partitions alternately placed in such a manner that the air therein will circuitously flow to the discharge port 24 and a discharge pipe 241 at the opposite side of the chamber 23, and that the noise caused by the friction between the air and the surface of the air passage will be greatly reduced.

In the space between the intake and discharge chambers 21 and 22, a stop rod 25 is set at an adequate position close to the periphery of the pump stock 20, and may project through the stop holes 32 and 45 on a rubber plate 30 and an air circulating plate 40 respectively while the latter two are overlaid onto the air chambers 21, 22, and 23. In such way, the intake and discharge chambers 21 and 22 and the air circulating ports 42 as well as 43 on the air circulating plate 40 will effect smooth one-way discharge function. Moreover, a threaded hole 26 is longitudinally formed at the center of the pump stock 20, through which a threaded bolt 46 may be screwed in to fasten the air circulating plate 40, the rubber plate 30, and the three air chambers tightly together.

The rubber plate 30 is made of soft rubber material and can cover all the three air chambers in the pump stock 20 at the same time. An opening 31 is formed at the center of the rubber plate 30 for the threaded bolt 46 to fit through; another two openings 33 are separately formed at proper positions for disposition over the intake and discharge chambers 21 and 22 respectively; and a stop hole 32 is formed to receive the stop rod 25. The rubber plate 30 is placed between the upper top of each air chamber of the pump stock 20 and the underside surface of the air circulating plate 40, so as to smooth the air circulation and reduce the vibration and noise generated during the movement of electromagnet 13.

The air circulating plate 40 over said rubber plate 30 also has a center opening 41 for the threaded bolt 46 to go through, two air circulating ports 42 and 43 aligned relative to the two openings 33, and a recess stop hole 45 to receive the stop rod 25. Each of the air circulating ports 42 and 43 has an engaging hole 401 for receiving, thereinto a diaphragm 44. Each diaphragm 44 has a projecting rod 441 with a larger diameter ball formed at the end of the rod 441 so that the diaphragms may be inserted into the air circulating ports 42 and 43 from the top side and from the under side, respectively, with the end balls of the projecting rods 441' extruding just out of the engaging holes 401 to prevent the diaphragms from easily detaching from the holes 401. Since the projecting rods 441 each have a diameter which is slightly larger than the bore of the engaging holes 401, and since they are made of elastic rubber, they can be forced into and tightly engaged within holes 401. After the above mentioned elements are overlaid sequentially, the threaded bolt 46 is used to tightly fix them together as shown in FIG. 3.

When soft pump diaphragm 12 is shifted upwardly, it will produce a suction effect, and the air will enter said intake chamber 21 through the intake port 201 and flow via the opening 33 into the first air circulating port 42 and spread upwardly, lifting up the 44, and finally enters the space located above the air circulating plate 40. When the pump diaphragm 12 is shifted downwardly, the air will simultaneously push the diaphragm 44 downwardly, going into the second air circulating port 43 to push down diaphragm 44 but without detaching diaphragm 44 from the air circulating port 43, so that air may pass therethrough and into opening 33 and flow into the discharge chamber 22, and then, flow into the air circulating chamber 23 via the side opening 221, passing by the projecting partitions, finally reaches the discharge port 24 and flows out through the discharge pipe 241, completing its one single circle of one-way discharge. At the time the pump diaphragm 12 is shifted upwardly, the diaphragm 44B will also be sucked upwardly to tightly close the port 43 preventing the air in said discharge chamber 22 from flowing in reverse.

Since the diaphragms 44A and 44B are specially designed as hereinbefore described, they will not detach from the air circulating ports 42 and 43. Therefore, the air pump with such a structure will reach its projected high efficiency in discharging air; the defects found in the prior art of air pumps for fish bowls are also completely eliminated.

What is claimed is:

1. An improved air pump for a fish bowl comprising:
   (a) a pump stock including an intake chamber, a discharge chamber, an air circulating chamber, a stop rod disposed between the intake and discharge chambers adjacent the external periphery of the pump stock, and a threaded hole formed at the center of the pump stock for receiving a screw;
   (b) the intake chamber being provided with an intake port at a lower side wall thereof, and the discharge chamber being separated from the intake chamber and provided with a side opening at an upper side wall for communicating with the air circulating chamber;
   (c) the air circulating chamber including a discharge port at a side wall opposite to the intake chamber for connection to a discharge pipe disposed outside the pump stock and a plurality of radially projecting and alternating partitions for defining a circuitous air flow path from the air circulating chamber to the discharge port;
   (d) a soft rubber plate provided with a central opening, an inlet port, an outlet port and a stop hole positioned in alignment with, respectively, the threaded hole, the intake chamber, the discharge chamber and the stop rod when the rubber plate is disposed on top of the pump stock;
   (e) an air circulating plate provided with a central opening, a first air circulating port, a second air circulating port, and a recess stop hole positioned in alignment with, respectively, the central opening, the inlet port, the outlet port and the stop hole of the rubber plate when the air circulating plate is disposed on top of the rubber plate;
   (f) the first and second air circulating ports being each provided with a central engaging hole for receiving a diaphragm valve, the diaphragm valve of the first air circulating port being disposed on the top side thereof and the diaphragm valve of the second air circulating port being disposed on the underside thereof; and
   (g) each diaphragm being formed of soft rubber material and provided with a projecting rod at its center, the projecting rod being of larger diameter than its corresponding engaging hole and including a ball formed at its end, the ball having a larger diameter than the diameter of the projecting rod and being of sufficient size for extrusion through the engaging hole when the diaphragm is disposed at its corresponding air circulating port.

* * * * *